(12) United States Patent
Echigo et al.

(10) Patent No.: US 6,606,412 B1
(45) Date of Patent: Aug. 12, 2003

(54) METHOD FOR CLASSIFYING AN OBJECT IN A MOVING PICTURE

(75) Inventors: Tomio Echigo, Yokohama (JP); Junji Maeda, Tokyo-to (JP); Hiroki Nakano, Otsu (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/384,743

(22) Filed: Aug. 27, 1999

(30) Foreign Application Priority Data

Aug. 31, 1998 (JP) ............................. 10-244556

(51) Int. Cl.[7] .............................. G06K 9/62; G06K 9/36; G06K 9/68; H04N 7/12
(52) U.S. Cl. ...................... 382/224; 382/240; 382/218; 375/240.19
(58) Field of Search ................................ 382/190, 191, 382/209, 217, 218, 224, 103, 277, 278, 279, 280, 118, 132, 232, 240, 248, 249; 348/155, 700; 375/240.12, 240.18, 240.19; 700/17

(56) References Cited

U.S. PATENT DOCUMENTS

| | | | | |
|---|---|---|---|---|
| 5,684,894 | A | * 11/1997 | Shustorovich | 382/232 |
| 5,828,769 | A | * 10/1998 | Burns | 382/118 |
| 6,075,878 | A | * 6/2000 | Yoshida et al. | 382/132 |
| 6,081,750 | A | * 6/2000 | Hoffberg et al. | 700/17 |
| 6,301,370 | B1 | * 10/2001 | Steffens et al. | 382/103 |

FOREIGN PATENT DOCUMENTS

JP  09-231375  9/1997

OTHER PUBLICATIONS

Tai Sing Lee, Image Representation Using 2D Gabor Wavelets, Oct. 1996, IEEE ISSN: 0162–8828, Transaction on Pattern Recognition and Machine Intelligence, vol. 18, No. 10, pp. 959–971.*

1997 IEEE, pp. 193–199, Michael Oren et al., "Pedestrian Detection Using Wavelet Templates".

SPIE, vol. 3024, pp. 938–952, A. Corghi et al., "Sequence Matching Using a Spatio–Temporal Wavelet Decomposition".

SPIE, vol. 3169, pp. 505–516, H. Nakano et al., "A Method for Detection and Visualization of Macro Defects in Color Liquid Crystal Displays by Using Gabor Wavelets".

* cited by examiner

Primary Examiner—Mehrdad Dastouri
(74) Attorney, Agent, or Firm—Ohlandt, Greeley, Ruggiero & Perle, L.L.P.; Daniel P. Morris

(57) ABSTRACT

The invention provides a method for classifying the motion of an object such as a human being in a moving picture. A template is prepared in advance, which includes the Gabor wavelet expansion coefficients of an object image in a plurality of frames of a video image sequence representing each of a plurality of different reference motions of an object in a moving picture. Then, processing is performed to obtain the Gabor wavelet expansion coefficients of an object image in a plurality of frames of a video image sequence representing an unknown motion of the object. Matching factors are calculated based on the expansion coefficients for the unknown motion and the expansion coefficients for the reference motions in the template, and finally the unknown motion is classified based on the matching factors.

10 Claims, 7 Drawing Sheets

METHOD FOR CLASSIFYING AN OBJECT IN A MOVING PICTURE

FIELD OF THE INVENTION

The present invention relates to a method for classifying the motion of an object such as a human being in a moving picture, and particularly to a method for classifying the motion of a non-rigid object in a moving picture by using a wavelet transformation.

Background of the Art

Recently, the processing of video images are performed in various A fields and applications along with the widespread use of personal computers. From now on, a variety of processings of video image including moving pictures will take a further step as the communication speed, and the processing speed and storage capacity of the computer increase.

However, since a motion picture contains non-rigid objects, or objects which are not fixed to a stationary state, there is a problem that the technique for processing a still picture cannot be directly applied. For instance, an object in a still picture can easily be classified by comparing the object image taken out from the still picture with the reference images in a template, and determining the reference image that is most closely analogous to the object to be processed. However, since an object in moving picture is in motion, change with time needs to be taken into consideration to classify an object in a moving picture.

The identification and classification of an object in a moving picture can be used in various applications. One example is automatic indexing and image retrieval by the contents of an image. For instance, motions of an athlete, such as jump and kick, can be inputted as contents to automatically retrieve scenes including the contents from a video image sequence. This may be used for retrieving highlight scenes, making a digest image, or retrieving the database of moving pictures. Further, by classifying the time-varying motion of each player in a moving picture of a sport, the motion of the player can also be analyzed.

Another example is automatic monitoring. It can be used to monitor the movements of people in a security area, and automatically detect dubious movements, thereby for preventing crimes. Still another example is a function as a man-machine interface. The inputting of data or control information to a computer by gesture instead of by a keyboard or voice, and conversion of motions by finger language to a visible output, voice output, or braile output may be made possible.

Accordingly, it is considered that the identification or classification of an object in a moving picture will exploit various applications in the future. Specifically, automatic image indexing is considered to be an element technique for standardizing the contents description in the MPEG-7 standard (the draft is scheduled to be prepared in the year 2001), and there is a demand for the establishment of a technique for it.

Image processing usually requires a tremendous amount of calculations, and the processing of a moving picture needs more calculations than the processing of a still picture. Accordingly, the technique for classifying an object in a moving picture can preferably detect the motion of the object accurately and easily with less amount of data processing.

Although a technique for identifying or classifying an object in a moving picture by using a wavelet transformation has not been proposed as far as the pre sent inventors know, the references concerning the image processing using the wavelet transformation include the following for instance.

(1) H. Nakano ettal., "Method for Detection and Visualization of Macro Defects in Color Liquid Crystal Displays by Using Gabor Wavelets, "PROCEEDINGS OF SPIE REPRINT, reprinted from Wavelet Applications in. Signal and Image Processing V, Jul. 30 –Aug. 1, 1997, Sandiego, Calif. Vol. 3169, pp. 505–516.

This reference is a paper written jointly with one of the present inventors, and it shows a method for detecting micro defects of a liquid crystal display by using 2D (two-dimensional) Gabor wavelet. The reference discloses equations 1 to 3 which are described later in this specification. However, it neither refers to the classification of the motion of an object in a moving picture, nor suggests how to apply equations 1 to 3, to the detection of the motion of the object.

(2) M. Oren et al., "Pedestrian Detection Using Wavelet Templates, "Proceedings of the 1997 IEEE Computer Society Conference on Computer Vision and Pattern Recognition, 1997, pp. 193–199.

This reference shows a technique for classifying the pattern of a pedestrian by a wavelet transformation using a Haar function. However, the reference uses the wavelet transformation to detect a pedestrian from the background which is a still picture, and classify the pattern of the pedestrian. It does not detect and classify the motion of an object in a moving picture. Further, it also does not address the wavelet transformation using the Gabor wavelet in the present invention.

(3) A. Gorghi et al., "Sequence Matching Using a Spatio-Temporal Wavelet Decomposition, Proceedings of SPIE, Vol. 3024, pt. 2, pp. 938–952, Feb. 1997

This reference shows a technique for performing the indexing and retrieval of an image sequence by using a wavelet transformation. However, the reference is to perform the wavelet transformation of the whole image of each of key frames, and perform the indexing of an image scene by the normalized correlation of wavelet expansion coefficients among the key frames. It does not discuss the classification of an object itself in a moving picture, and shows nothing on the wavelet transformation using the Gabor wavelet in the present invention.

(4) Published Unexamined Patent Application No. 9-231375 This reference shows a technique for detecting the motion of an image by using a wavelet transformation. The image of one frame is decomposed to eight pixel blocks, and each pixel block is transformed to a multi-resolution block by the wavelet transformation. The wavelet coefficients of the corresponding multi-resolution blocks of the previous and current frames are compared, and the existence of a motion is determined based on the difference between them. The motion detected in this way is used to specify a region to be updated preferentially. The reference does not refer to the classification of the motion of an object in a moving picture. In addition, it also does not show the wavelet transformation using the Gabor wavelet in the present invention.

Problems to be Solved by the Invention

Accordingly, it is an object of the present invention to provide an effective method for classifying the motion of an object in a moving picture.

It is a further object of the present invention to provide a method for detecting and classifying an unknown pattern of an object by a wavelet transformation using a specific Gabor wavelet function.

SUMMARY OF THE INVENTION

The method for classifying an object in a moving picture according to the present invention comprises a step of preparing a template including the wavelet expansion coefficients of an image of the object in a plurality of frames of a video image sequence representing each of a plurality of reference motions of the object, a step of obtaining the wavelet expansion coefficients of an image of said object in a plurality of frames of a video image sequence representing an unknown motion of the object, a step of calculating the matching factors between the unknown motion and the reference motions based on the wavelet expansion coefficients for the unknown motion and the wavelet expansion coefficients for the reference motions in the template, and a step of classifying the unknown motion based on the matching factors.

Wavelet expansion coefficients are obtained based on a Gabor wavelet function. Preferably, the wavelet expansion coefficients are obtained at a plurality of selected sampling points of the object image, with the coordinate origin being set o approximately the center of the object. Further, the wavelet expansion coefficients are obtained at a plurality of scale transformation levels, and the number of sampling points is set to a different number for each of the levels. The calculation of the matching factors is preferably performed by assigning a predetermined weight to the expansion coefficients according to the scale transformation levels. Furthermore, the wavelet expansion coefficients are preferably obtained by a plurality of predetermined rotation positions with each sampling point being the center of rotation.

DESCRIPTION OF SYMBOLS

Figure 1:
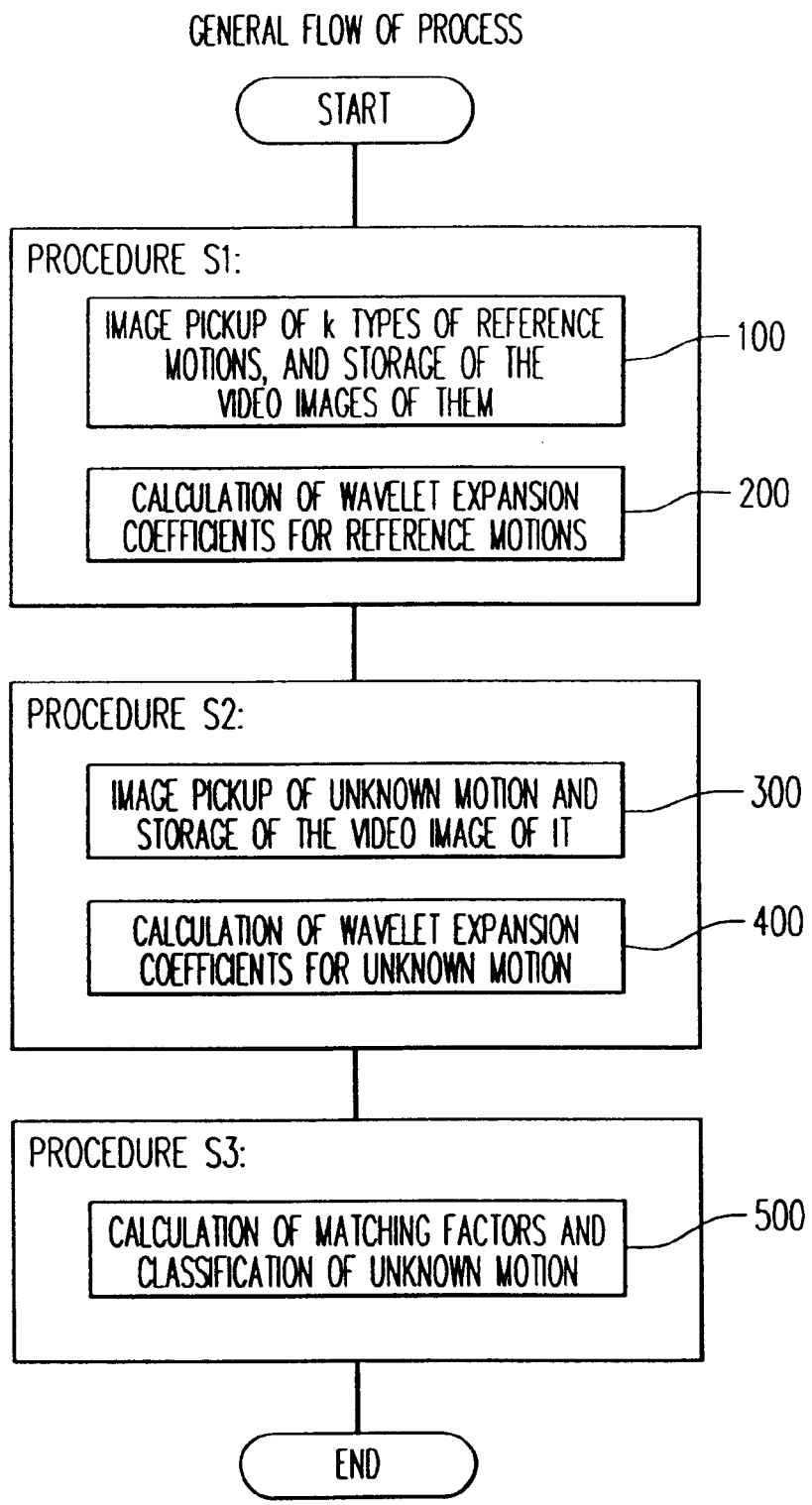
FIG. 1 is a flowchart showing the basic procedures of the present invention.

S1, S2, S3 . . . Basic procedures
100 . . . Part of procedure S1 for reference motion pickup/storage
200 . . . Part of procedure S1 for calculating Gabor wavelet expansion coefficients
300 . . . Part of procedure S2 for unknown motion pickup/storage
400 . . . Part of procedure S2 for calculating Gabor wavelet expansion coefficients
500 . . . Part of procedure S3 for calculation/classifying matching factors

DETAILED DESCRIPTION OF THE PREFERRED EMBODIMENT

Now, a preferred embodiment of the present invention is described. This example is described as classifying the motion of a human body. In the present invention, "motion" represents a unit of movement which is made up of a plurality of image frames, for instance, a collective movement such as jump, kick, or walking, which can be recognized as an action.

FIG. 1 shows the basic procedure of the present invention. A procedure S1 comprises a part 100 in which, for each of k types of reference motions, the image of the reference motion is captured or picked up, and a video image representing the reference motion is stored, and a part 200 for wavelet-transforming the stored video image and calculating wavelet expansion coefficients. k is the number of the types of motions used for classification, and can be arbitrarily selected.

A procedure S2 comprises a part 300 for capturing the image of an unknown motion, and storing a video image representing the unknown motion, and a part 400 for transforming the stored video image by wavelet transformation, and calculating wavelet expansion coefficients.

A procedure S3 comprises a part 500 for calculating matching factors based on the wavelet expansion coefficients obtained in the procedure S2 and the wavelet expansion coefficients obtained in the procedure S1, and classifying the unknown motion based on the result of the calculation.

Figure 2:
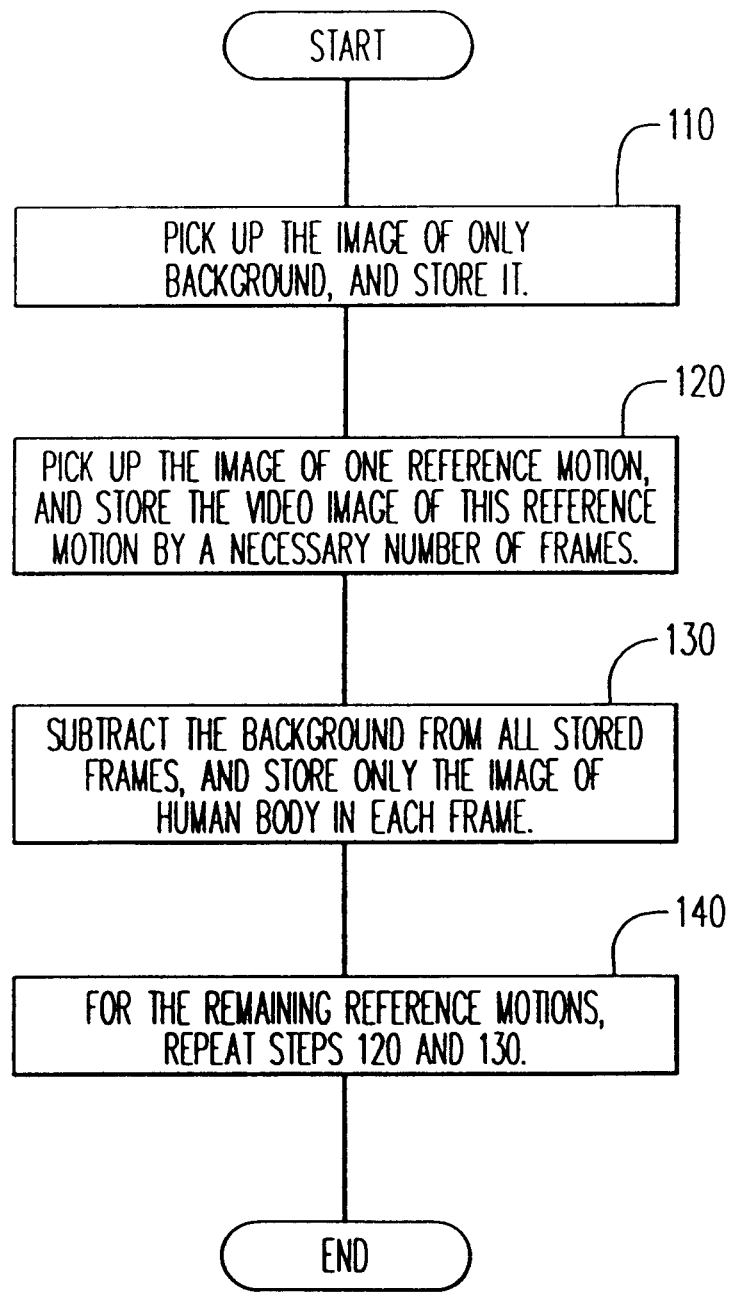
FIG. 2 is a flowchart showing the specific steps in the part 100 of the procedure S1.

FIG. 2 represents the steps in the part 100 of the procedure S1. The part 100 comprises four steps 110, 120, 130, and 140.

Step 110:

A background video image including no human being is created by an image input/output device such as a camera or a video player, and stored in the storage device of a computer. The image is stored as digital video data representing the gray scale level of each pixel by a digital value. A color image is transformed to a digital gray scale image. The background image is a reference for extracting a human body.

Step 120:

The image of a person giving one reference motion in front of the background stored in step 110 is captured by an image input/output device such as a camera or a video player. Then, in a section between the predetermined start and end points of the reference motion, an image for each of a necessary number (F) of frames is sampled, and stored in the storage device of the computer. Similarly, the frame images are stored as digital video data representing the gray scale level of each pixel as a digital value. For a video image sequence of 30 frames/sec, the appropriate number of frames to be sampled is 5 to 10 per second for a typical motion. The number of necessary frames F for representing one motion is usually in the order of 10 to 30. Frames are preferably sampled at a regular sampling interval. The sampling interval and the number of frames F to be sampled can be appropriately selected according to the characteristics of the motion to be processed.

Step 130:

For all the frames stored in the storage device, a subtraction of the background image is carried out. The subtraction is executed by performing the subtraction between the values of the corresponding pixels of the two frame images (frame image of the background, and frame image including a person). The resultant frame image includes the pattern image of an object which contains no background. The absolute value of the result of the subtraction is stored in the storage device of the computer on a frame basis.
Step 140:

For remaining reference motions, the above steps 120 to 130 are repeated to complete the processing of the part 100 of the procedure S1.

In addition, if motions belonging to the same type have different action speeds, then the object images in the frames change, which provides different wavelet expansion coefficients. Accordingly, if motions of the same type can occur at different action speeds, separate reference motions are preferably prepared for some different operation speeds.

Figure 3:
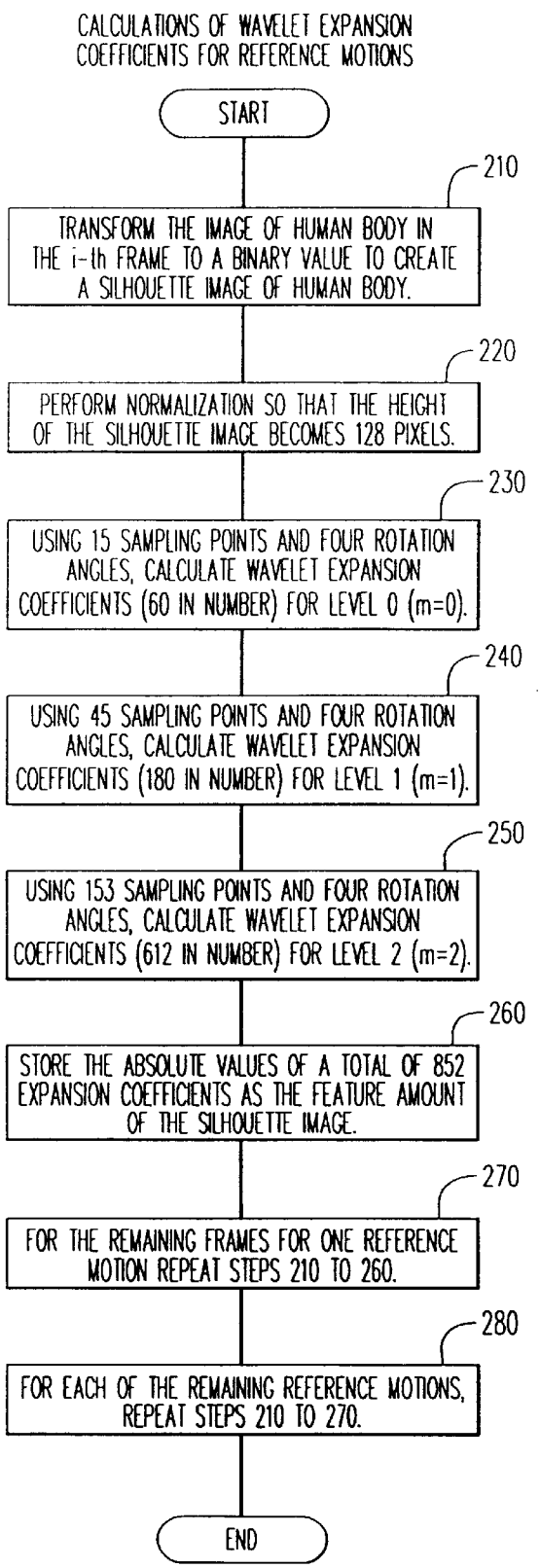
FIG. 3 is a flowchart showing the specific steps in the part 200 of the procedure S1.

FIG. 3 shows the specific steps in the part 200 of the procedure S1. The part 200 is to calculate wavelet expansion coefficients from the motion images created in the part 100, and comprises steps 210 to 280.
Step 210:

The image of a human body in the selected frame (i-th frame) of the F frames for one reference motion is transformed to binary data to create a silhouette image of the human body. The transformation to binary data is accomplished by giving 0 to pixels lower than a predetermined threshold value and 1to pixels equal to or higher than the threshold value in the absolute value data obtained in step 130. The threshold value is set based on the difference between the gray-scale value of the human body and that of the background so that the silhouette of the human body can be extracted well.
Step 220

Normalization is performed so that the height of the silhouette image is, for instance, 128 pixels. The width of the normalized silhouette image is determined by the reduction ratio for making the silhouette image height to 128 pixels. By the normalization, a silhouette image $s(x, y)$ is obtained, where $-63 \leq (x, y) \leq 64$.
Step 230:

Then, for the silhouette image $s(x, y)$, the calculation of the Gabor wavelet expansion coefficients at a scale transformation level 0 (m=0) is performed. In the present invention, the Gabor wavelet coefficients of the image $s(x, y)$ at coordinates $(x_0, y_0)$ are expressed by Eq. (1);

$$(T_{m,l}s)(x_0, y_0) = \alpha^m \sum_{y=-q/2+1}^{q/2} \sum_{x=-p/2+1}^{p/2} s(x, y)\psi_l(\alpha^m x - x_0, \alpha^m y - y_0), \quad (1)$$

where $$\psi_l(x,y) = \psi(\dot{x}, \dot{y}), \quad (2)$$

$$\begin{bmatrix} \dot{x} \\ \dot{y} \end{bmatrix} = \begin{bmatrix} \cos\varphi_l & \sin\varphi_l \\ -\sin\varphi_l & \cos\varphi_l \end{bmatrix} \begin{bmatrix} x \\ y \end{bmatrix}, \quad (3)$$

and $$\psi(x, y) = \frac{1}{4\pi^2 \sigma_0^2} e^{\frac{-1}{4\pi\sigma_0^2}(x^2+y^2)} \left[ e^{ju_0 x} - e^{-\pi\sigma_0^2 u_0^2} \right]. \quad (4)$$

j is $(-1)^{1/2}$ (imaginary unit), $\alpha$ is a scale constant, m is a scaling parameter for giving a scale transformation level, p is the number of pixels in the x-direction of an object silhouette image, q is the number of pixels in the y-direction of an object silhouette image, $(x_0, y_0)$ is the coordinates of a sampling point, $\phi_l$ is the rotation angle of Gabor wavelet around a sampling point $(x_0, y_0)$, l is a rotation step, $u_0$ is the central frequency of Gabor wavelet of Eq. (4) (unit: radian/pixel), and $\sigma_0^2$ is variance of a Gaussian window function. The central frequency of Gabor wavelet of Eq. (4) is $2\pi/u_0$. In this embodiment, $\alpha=2$, $u_0=0.1$, and $\sigma_0^2=12$ were assumed.

Eq. (1) to Eq. (4) are now described. Eq. (1) represents the two-dimensional wavelet transformation of an image $s(x, y)$ with Eq. (4) being the basic wavelet function. Wavelet expansion coefficients are obtained by Eq. (1). The basic wavelet function may also be referred to as "analyzing wavelet" or "mother wavelet." $\psi(x, y)$ in Eq. (4) is a kind of Gabor function, and the basic wavelet function shown in Eq. (4) is called Gabor wavelet in this specification. Eq. (2) and Eq. (3) represent a rotation of an angle $\phi_l$ with the origin of the x-y plane (x=0, y=0) being the center of rotation. In Eq. (1), the coordinate position is shifted by the coordinates $(x_0, y_0)$ of a sampling point. Accordingly, the rotation of the angle $\phi_l$ in Eq. (3) is performed with the sampling point being the center of rotation.

The Gabor function is a generic name for spatially localized functions such as Gaussian function modulated by sine wave, as known well, and various Gabor functions have been proposed. The Gabor function of Eq. (4) used in the present invention has two features. One feature is that the portion of the following Eq. (5) forms a window function called two-dimensional Gaussian window, and it is normalized by a normalization coefficient $1/(4\pi^2\sigma_0^2)$ so that the maximum value of $\psi(x, y)$ in the frequency domain becomes 1. The calculation of the expansion coefficients of Gabor wavelet is performed in the frequency domain, and the calculation can be simplified by normalizing the maximum value in the frequency domain to 1. The other feature is that the portion of the following Eq. (6) acts as a correction term for zeroing the D.C. component of $\psi(x, y)$.

$$e^{\frac{-1}{4\pi\sigma_0^2}(x^2+y^2)}, \quad (5)$$

$$-e^{-\pi\sigma_0^2 u_0^2}. \quad (6)$$

In the case in which the D.C. component is not 0, if expansion coefficient are sought for a "flat" image area having a pixel value which is not 0, namely, an image area having no contrast (for instance, a silhouette image in which the human body portion is set to binary one), a nonzero result proportional to the pixel value is obtained. Basically, a wavelet expansion coefficient means the correlation between its basis function and a signal; so it is not desirable that the expansion coefficient varies by a factor other than correlation. Accordingly, the Gabor function having a nonzero D.C. component is not suitable for classifying a motion. Eq. (4) has a correction term Eq. (6) for zeroing the D.C. component of $\psi(x, y)$.

Eq. (1) to Eq. (4) were disclosed in the above described paper by one of the present inventors, H. Nakano, and the present invention is based upon the finding that the motion of an object such as a person can advantageously be analyzed by the wavelet transformation according to Eq. (1) including the Gabor wavelet of Eq. (4).

In Eq. (1), $\alpha^m$ represents a scale transformation, $x_0$ and $y_0$ represent a shift transformation by the coordinates of a sampling point, and 1 represents a rotation around the sampling point. Accordingly, the wavelet transformation by equation 1 corresponds to the obtaining of the local correlation between a class of basis functions obtained by moving the scale parameter, shift parameter, and rotation parameter of the Gabor wavelet and a silhouette image. Accordingly, if the arm shape of the human body in an object image and the waveform of the Gabor wavelet are analogous, then the amplitude of the expansion coefficient locally increases at that position.

The scale parameter $\alpha^m$ has an effect on the spatial frequency component of a wavelet expansion coefficient. The scale transformation level m can take any natural number. As m increases, fine features (high-frequency components) of an object can be extracted. By obtaining wavelet expansion coefficients at a plurality of transformation levels, low-frequency components (macroscopic components) and high-frequency components (microscopic components) can be detected. However, more features of a motion are contained in the low-frequency components, and the increasing of the number of levels is not necessarily useful for extracting the features of the motion. Further, the amount of the calculation increases as the number of levels increases. Accordingly, usually, three levels (m=0, 1, or 2) or so are sufficient.

To analyze a human motion by the Gabor wavelet transformation by equation 1, it is needed to appropriately select the coordinate origin and the central wavelength $2\pi/u_0$ of the Gabor wavelet.

The coordinate origin is preferably set at approximately the center of the human body. The human motion or posture is characterized by the relations of the positions of the head and limbs relative to the center of the body. By setting the coordinate origin at the center of an object (for a human being, the center of the body), a change in the posture can easily be detected.

Since the wavelet expansion coefficient varies with the position of the origin, the coordinate origin in each frame is preferably always set at the center of the object. However, the wavelet expansion coefficient contains both the microscopic component (high-frequency component) and the macroscopic component (low-frequency component), and the macroscopic component is relatively less affected by the positional deviation of the origin or the change in the profile of the object. Further, the Gabor wavelet expansion coefficient includes a real part and an imaginary part (they are 90 degrees out of phase with each other), and the absolute value (amplitude) of the expansion coefficient does not varies largely even if the sampling coordinates change to some degree depending on the setting of the origin (x=0, y=0). That is, there is a merit that the wavelet transform is tolerant of positional deviation. Accordingly, the origin need not be accurately positioned at the center of the object, but it is only required that the origin be in the vicinity of the center.

The central wavelength $2\pi/u_0$ of the Gabor wavelet is preferably set to about two times the body width. The setting of $2\pi/u_0$ to about two times the body width enhances the correlation between the Gabor wavelet for the scale transformation level m=0 and the body shape, and information on the posture of the body is well reflected on the expansion coefficients. Specifically, the wavelength λ in equation 1 for m=0 becomes $\lambda=20\pi$ (about 60 pixels) from $\lambda=2/\alpha^m u_0$ (in the embodiment, $u_0=0.1$, $\alpha=2$). This enhances the correlation with the silhouette image portion having a width of $10\pi$ (about 30 pixels). The width of $10\pi$ approximately corresponds to the body width of a human body in a silhouette image normalized to 128 pixels in height. The central wavelength for m=1 becomes $10\pi$ (about 30 pixels), and the correlation with the silhouette portion having a width of $5\pi$ (about 15 pixels) is strengthened. Even if m is increased to 4 or greater, only minute changes in the silhouette profile are detected, and it is not always effective in extracting the features of a motion.

Figure 4:
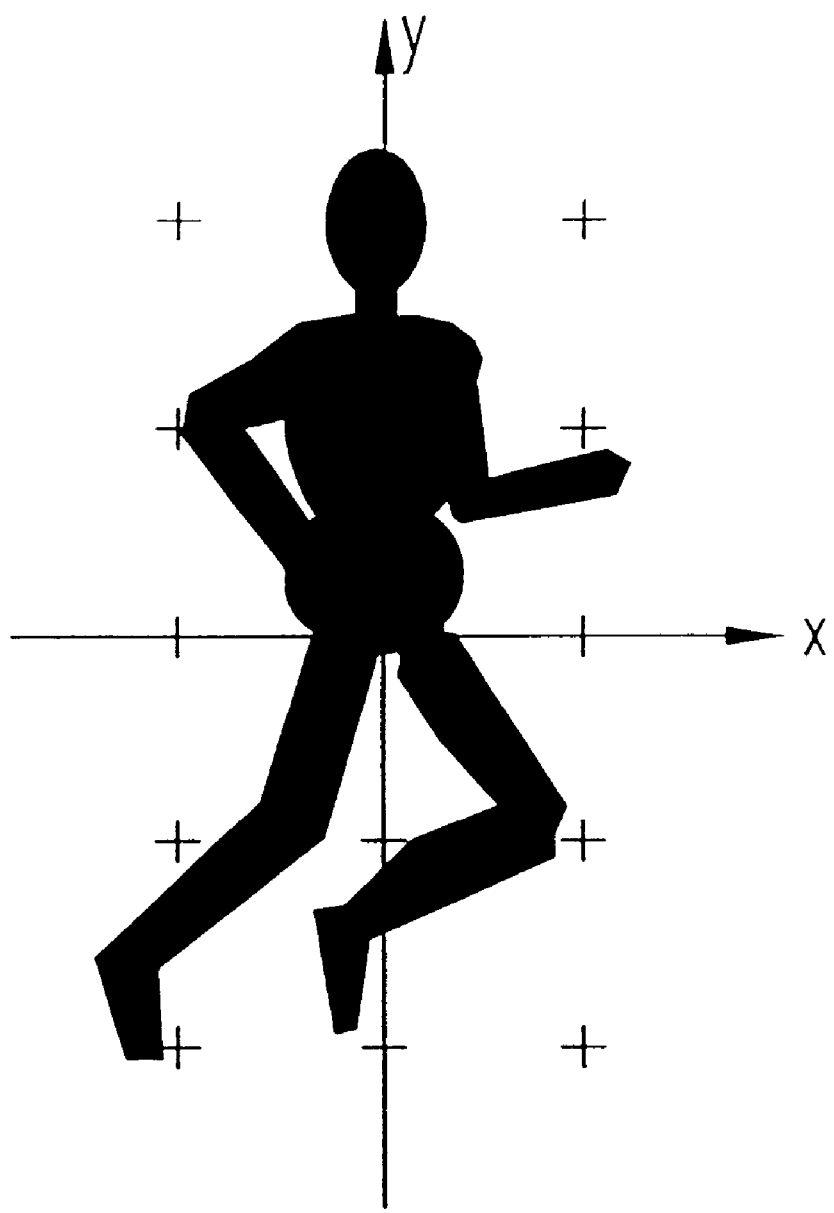
FIG. 4 is an illustration showing the sampling points used for obtaining wavelet expansion coefficients at the level m=0.

Now, with reference to FIG. 4, description is specifically made to the process for obtaining wavelet expansion coefficients for the shown human body. Expansion coefficients need not be obtained at all the coordinates. By obtaining them only at selected sampling points, the features of the object pattern can be fully extracted. The distance between sampling points is set according to the scale transformation level. For m=0, the distance between sampling points is preferably set to the order of $\pi/u_0$. As the sampling points, a total of 15 coordinate points were taken for three coordinate positions in the x-direction ($x_0$=[−24, 0, 24]) and five coordinate positions in the y-direction ($y_0$=[−48, −24, 0, 24, 48]), as shown by cross-shaped marks.

The Gabor wavelet of equation 3 has directivity. To reflect the directivity to increase the detection accuracy, Gabor wavelet expansion coefficients are obtained with l number of different rotation angles given by equations 2.1 and 2.2, with each sampling point being used as the center of rotation. By rotating the Gabor wavelet, a wavelet reflecting the bending of the arms or legs in a specific direction can be formed. In this example, expansion coefficients were obtained, for l=4, for instance, at $\phi_l=[0, \pi/4, \pi/2, 3\pi/4]$. Accordingly, for m=0, a total of 60 expansion coefficients are obtained.

Step 240:

Then, using equation 1, the Gabor wavelet expansion coefficients for level 1 (m=1) is calculated. For m=1, the sampling points were a total of 45 coordinate points for five coordinate positions in the x-direction ($x_0$=[−24, −12, 0, 12, 24]) and nine coordinate positions in the y-direction ($y_0$=[−48, −36, −24, −12, 0, 12, 24, 36, 48]). Since expansion coefficients are obtained at four angles per sampling point, as in step 230, a total of 180 expansion coefficients are obtained for m=1.

Step 250:

Using equation 1, the Gabor wavelet expansion coefficients for level 2 (m=2) is calculated. For m=2, the sampling points were a total of 153 points for nine coordinate positions in the x-direction ($x_0$=[−24, −18, −12, −6, 0, 6, 12, 18, 24]) and 17 coordinate points in the y-direction ($y_0$=[−48, −42, −36, −30, −24, −18, −12, −6, 0, 6, 12, 18, 24, 30, 36, 42, 48]). Since expansion coefficients are obtained at four angle positions per sampling point, as in step 230, a total of 180 expansion coefficients are obtained for m=2.

Step 260:

The absolute values of a total of 852 expansion, coefficients obtained in steps 230–250 are stored in the memory of the computer as the feature measures or feature vectors of the silhouette image.

Step 270:

For the remaining (F-1) frames of the F frames forming one reference motion under consideration, the above steps 210–260 are repeated. When the processing of the F frames of one reference motion terminates, the calculation process of the expansion coefficients for one reference motion terminates.

Step 2.80:

For each of the remaining (k-1) reference motions of the k types of reference motion, the above steps 210–270 are repeated. The sequence of wavelet expansion coefficients for the k types of reference motions created in steps 210–280 is stored in the memory as a template for classifying unknown motions.

Figure 5:
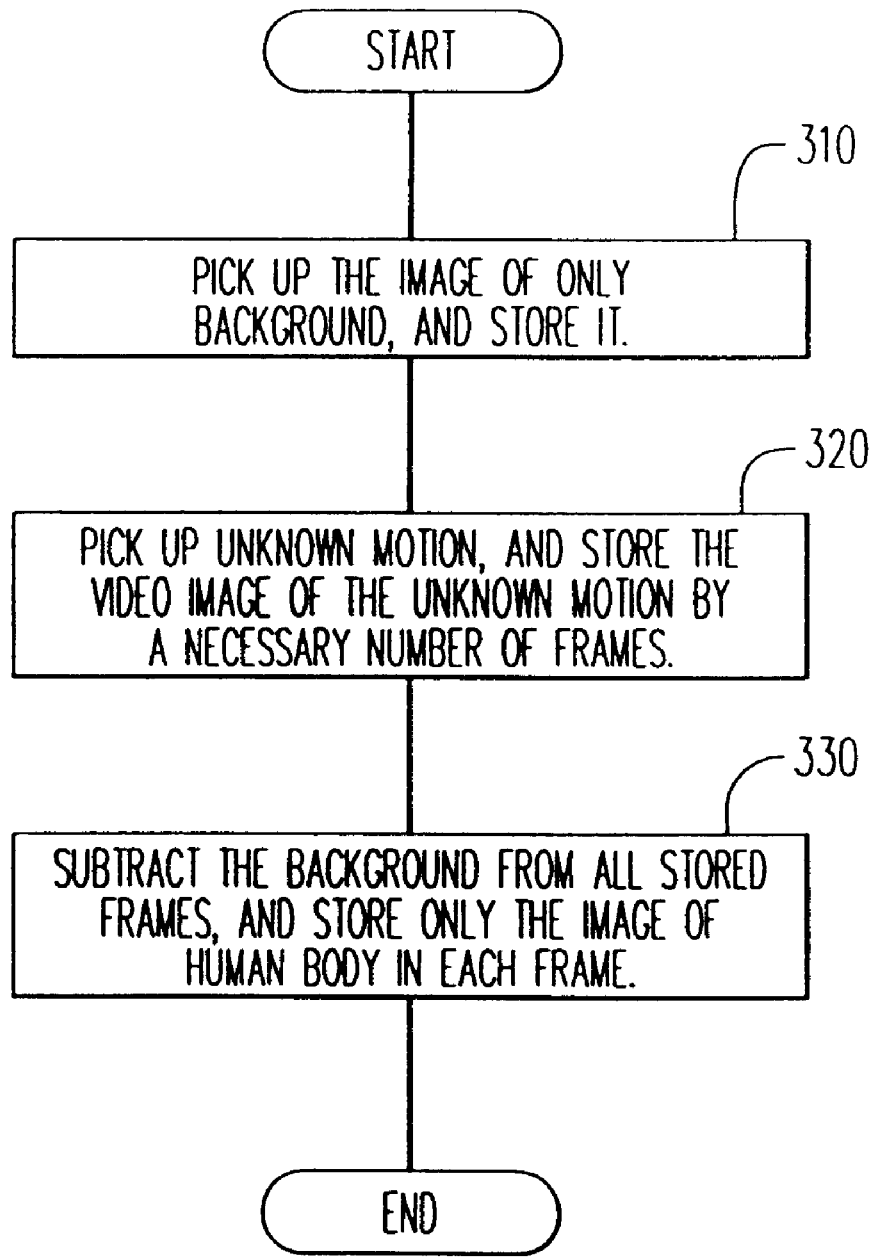
FIG. 5 is a flowchart showing the specific steps in the part 300 of the procedure S2.
Figure 6:
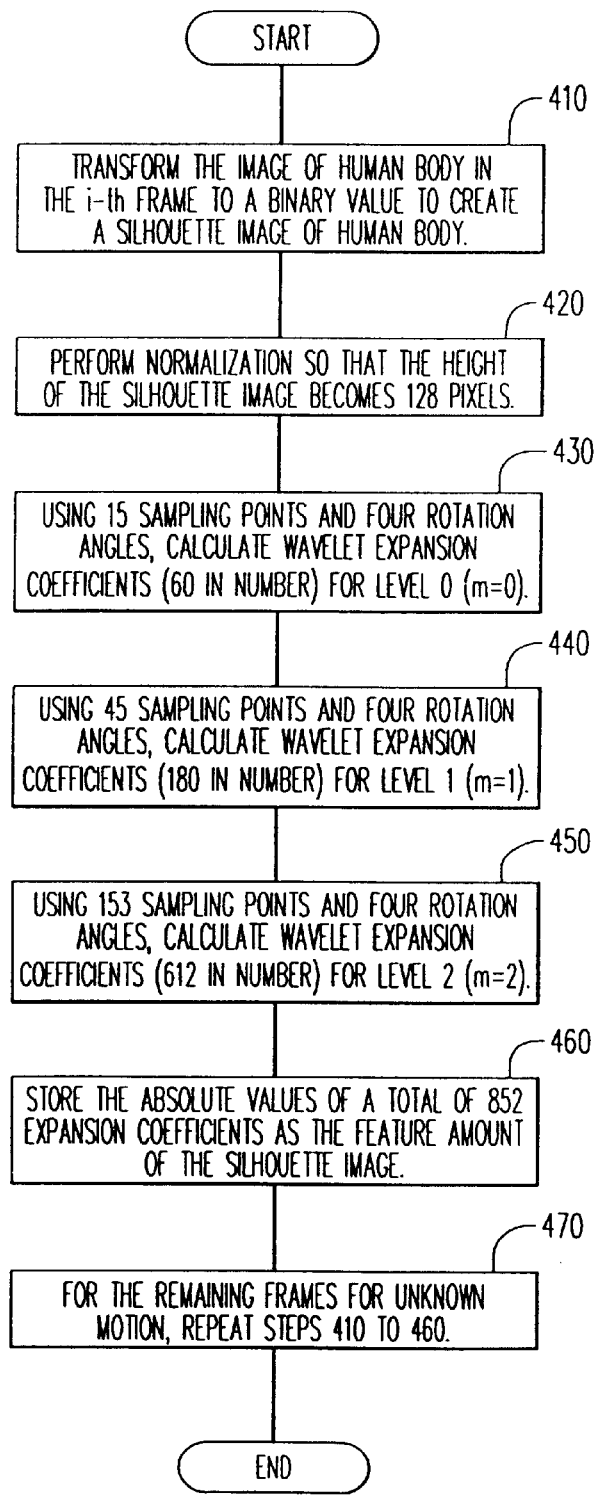
FIG. 6 is a flowchart showing the specific steps in the part 400 of the procedure S2.

FIG. 5 represents the specific steps in the part 300 of the procedure S2. The part 300 comprises three steps 310, 320, and 330. FIG. 6 shows the specific steps in the part 400 of the procedure S2. The part 400 is to calculate wavelet expansion coefficients from the unknown motion image created in the part 300, and it comprises steps 410–470. The procedure S2 is the same as the procedure S1 except for the point that a video image representing one unknown motion is processed instead of the k types of reference motions in the procedure S1. Steps 310–330 of FIG. 5 correspond to steps 110–130 of FIG. 2, and steps 410–470 of FIG. 6 correspond to steps 210–270 of FIG. 3. Accordingly, the detailed description of each step is omitted.

The point to be noted in the procedure S2 is the number of frames extracted in the unknown motion. If the start and end points of the unknown motion corresponding to the start and end points of the reference motion can be identified, it is only needed to cake out the same number of frames as the reference motion in the section between the start and end points.

However, the start and end points of the unknown motion can happen to be indefinite. In such case, it is necessary to take out, from a video section including the unknown motion, more frames than F at the same sampling interval. In this case, examination should be made in the groups of F frames, which are shifted by one frame from each other, when calculating matching factors to be described later with reference to FIG. 7.

Figure 7:
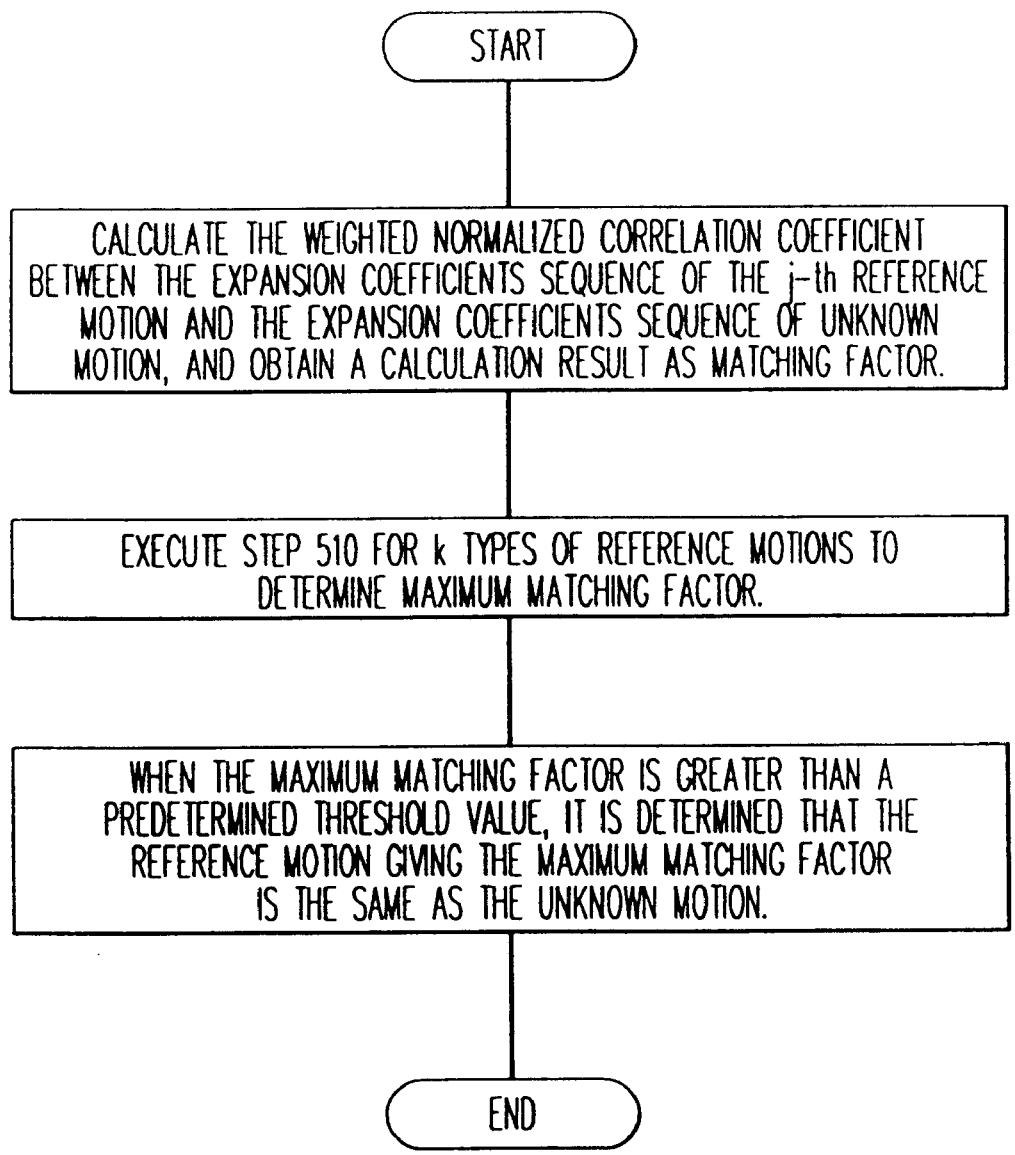
FIG. 7 is a flowchart showing the procedure S3 for calculating matching factors, and classifying an unknown motion to one of the known reference motions according to the result of the calculation of matching factors.

FIG. 7 shows the procedure S3 for calculating matching factors, and classifying the unknown motion to one of the known reference motions according to the result of the calculation of matching factors, and it comprises steps 510–530.

Step 510:

Weights corresponding to the level m are assigned to the expansion coefficients sequence of the unknown motion and the expansion coefficients sequence of the j-th reference motion, respectively. By way of example, it is assumed that the weight W(0) for the level 0 is 0.8, the weight W(1) for the level 1 is 1.0, and the weight W(2) for the level 2 is 0.8. The weights are determined based on which levels have important expansion coefficients as the feature measures, and this is decided empirically.

The weighted expansion coefficients sequences of the j-th reference motion and of the unknown motion are assumed to be Rj(n) and T(n), respectively, ($1 \leq n \leq N$). N is the product of the number of expansion coefficients per frame and the number of frames F. The correlation value Cj($-1 \leq Cj \leq 1$) by normalized correlation is defined by Eq. (7);

$$C_j = \frac{\sigma_{RT}^2}{\sqrt{\sigma_R^2 \cdot \sigma_T^2}}, \quad (7)$$

where $\sigma_R^2$ is the variance of the weighted expansion coefficients sequence Rj(n) of the j-th reference motion, $\sigma_T^2$ is the variance of the weighted expansion coefficients sequence T(n) of the unknown motion, and $\sigma_{RT}^2$ is the covariance of Rj(n) and T(n). $\sigma_R^2$, $\sigma_T^2$, and $\sigma_{RT}^2$ are obtained in Eq. (9), Eq. (10) and Eq. (8), respectively;

$$\sigma_{RT}^2 = \frac{\sum_{n}^{N}(R_j(n) - \overline{R})(T(n) - \overline{T})}{N}, \quad (8)$$

$$\sigma_R^2 = \frac{\sum_{n}^{N}(R_j(n) - \overline{R})^2}{N}, \quad (9)$$

$$\sigma_T^2 = \frac{\sum_{n}^{N}(T(n) - \overline{T})^2}{N}, \quad (10)$$

where $$\overline{R} = \frac{\sum_{n}^{N} R_j(n)}{N}, \quad \text{and}$$

$$\overline{T} = \frac{\sum_{n}^{N} T(n)}{N}.$$

Step 520:

Step 510 is executed for all the k types of reference motions. That is, Cj of equation 7 is obtained for all the reference motions. Then, the maximum value Cj(max) among them is obtained. Cj(max) represents the largest matching factor.

Step 530:

When the maximum matching factor Cj(max) is larger than a predetermined threshold value, it is determined that the reference motion corresponding to the maximum matching factor is the same as the unknown motion. Accordingly, the unknown motion is identified as matching the reference motion that gives the maximum matching factor, and classified.

In addition, if more frames than F were taken out for the unknown motion, the matching factor with each motion needs to be examined in the groups of F frames, which are shifted by one frame from each other. The reference motion giving the largest matching factor represents the identified motion, and the frame group giving the largest matching factor corresponds to the particular unknown motion.

Further, in the above described example, the number of levels has been set to 3 (m=0, 1, 2), the number of sampling points for each m has been set to 15, 60, and 180, respectively, and the rotation angles for each sampling point has been set to 4, but these numbers may take other values. Generally, the analyzing accuracy increases as these numbers increase, but necessary calculations increase and the processing speed slows down. Moreover, the classification of complex motions requires more accurate analysis than simple motions. Accordingly, the numbers of levels, sampling points, and rotation angles can appropriately be selected according to the complexity of the motion to be classified, or the required analyzing accuracy.

In addition, although a human body has been shown as an example of the object to be classified in this application, it will be understood that the present invention applicable to the classification of the motion of a portion of a human body, such as hands, fingers, or arms, or the motion of any object such as an animal, or a human being in an animation.

Advantages of the Invention (1) By obtaining feature vectors from the wavelet expansion coefficients for a series of object images representing the motion of an object, and taking the time-series correlation on such feature vectors, the motion can be identified and classified.

(2) The wavelet transformation can analyze an object macroscopically or microscopically according to the scale transformation level m (by the characteristics of multi-resolution analysis). Accordingly, for instance, even if part of the object profile is hidden or missing, or there is a difference in physique (size, thickness), the characteristics of the motion can be detected as a whole.

(3) Features can be extracted with relatively less sampling points, so the calculation amount can be reduced to enhance the processing efficiency. Further, the data amount of wavelet expansion coefficients is 1/10 to 1/100 of the original video image, and thus the calculations for matching factors also remarkably decrease.

(4) By setting the origin at approximately the center of an object, and making the central wavelength $2\pi/u_0$ of Gabor wavelet approximately double the object width, the characteristics of the posture of a human body can be effectively extracted.

What is claimed is:

1. A method for classifying an object in a moving picture, comprising:

preparing a template that includes Gabor wavelet expansion coefficients of an image of said object in a plurality of frames of a video image sequence representing each of a plurality of different reference motions of said object;

obtaining Gabor wavelet expansion coefficients of an image of said object in a plurality of frames of a video image sequence representing an unknown motion of said object;

calculating matching factors between said unknown motion and said reference motions based on said Gabor wavelet expansion coefficients for said unknown motion and said reference motions in said template; and classifying said unknown motion based on said matching factors, wherein said Gabor wavelet expansion coefficients are obtained at a plurality of selected sampling points in said object image, and wherein said Gabor wavelet expansion coefficients are obtained at a plurality of scale transformation levels, and a number of said sampling points is set to a different number for each of said levels.

2. The method as set forth in claim 1, wherein said Gabor wavelet expansion coefficients are obtained based on a Gabor wavelet function.

3. The method as set forth in claim 1, wherein said Gabor wavelet expansion coefficients are obtained with a coordinate origin being set to approximately a center of said object.

4. The method as set forth in claim 1, wherein said calculating said matching factors is performed by assigning a predetermined weight to said Gabor expansion coefficients according to said scale transformation levels.

5. The method as set forth in claim 1, wherein said Gabor wavelet expansion coefficients are obtained at a plurality of rotation positions with each said sampling point being a center of rotation.

6. The method as set forth in claim 5, wherein said Gabor wavelet expansion coefficients are obtained based on Eq. (11), $$(T_{m,l}s)(x_0, y_0) = \alpha^m \sum_{y=-q/2+1}^{q/2} \sum_{x=-p/2+1}^{p/2} s(x, y)\psi_l(\alpha^m x - x_0, \alpha^m y - y_0), \quad (11)$$

where $$\psi_l(x, y) = \psi(\dot{x}, \dot{y}), \quad (12)$$

$$\begin{bmatrix} \dot{x} \\ \dot{y} \end{bmatrix} = \begin{bmatrix} \cos\varphi_l & \sin\varphi_l \\ -\sin\varphi_l & \cos\varphi_l \end{bmatrix} \begin{bmatrix} x \\ y \end{bmatrix}, \quad (13)$$

and $$\psi(x, y) = \frac{1}{4\pi^2 \sigma_0^2} e^{\frac{-1}{4\pi\sigma_0^2}(x^2+y^2)} \left[ e^{ju_0 x} - e^{-\pi\sigma_0^2 u_0^2} \right], \quad (14)$$

j: $(-1)^{1/2}$ (imaginary unit),
α: scale constant,
m: scaling parameter for giving a scale transformation level,
p: number of pixels in the x-direction of object image,
q: number of pixels in the y-direction of object image,
$(x_0, y_0)$: coordinates of a sampling point,
$\phi_l$: rotation angle of Gabor wavelet around a sampling point $(x_0, y_0)$,
l: rotation step,
$u_0$: central frequency of Gabor wavelet of Eq. (14), and
$\sigma_0^2$: variance of Gaussian window function.

7. A method for classifying an object in a moving picture, comprising:

preparing a template that includes Gabor wavelet expansion coefficients of an image of said object in a plurality of frames of a video image sequence representing each of a plurality of different reference motions of said object;

obtaining Gabor wavelet expansion coefficients of an image of said object in a plurality of frames of a video image sequence representing an unknown motion of said object;

calculating matching factors between said unknown motion and said reference motions based on said Gabor wavelet expansion coefficients for said unknown motion and said reference motions in said template; and classifying said unknown motion based on said matching factors, wherein said Gabor wavelet expansion coefficients are obtained at a plurality of selected sampling points in said object image, wherein said Gabor wavelet expansion coefficients are obtained at a plurality of rotation positions with each said sampling point being a center of rotation, wherein said object is a human body, and a central wavelength $2\pi/u_0$ of said Gabor wavelet is about two times a width of said human body, and wherein said Gabor wavelet expansion coefficients are obtained based on Eq. (19), $$(T_{m,l}s)(x_0, y_0) = \alpha^m \sum_{y=-q/2+1}^{q/2} \sum_{x=-p/2+1}^{p/2} s(x, y)\psi_l(\alpha^m x - x_0, \alpha^m y - y_0), \quad (19)$$

where $$\psi_l(x, y) = \psi(\dot{x}, \dot{y}), \quad (20)$$

$$\begin{bmatrix} \dot{x} \\ \dot{y} \end{bmatrix} = \begin{bmatrix} \cos\varphi_l & \sin\varphi_l \\ -\sin\varphi_l & \cos\varphi_l \end{bmatrix} \begin{bmatrix} x \\ y \end{bmatrix}, \quad (21)$$

and $$\psi(x, y) = \frac{1}{4\pi^2 \sigma_0^2} e^{\frac{-1}{4\pi\sigma_0^2}(x^2+y^2)} \left[ e^{ju_0 x} - e^{-\pi\sigma_0^2 u_0^2} \right], \quad (22)$$

j: $(-1)^{1/2}$ (imaginary unit),

α: scale constant, m: scaling parameter for giving a scale transformation level, p: number of pixels in the x-direction of object image, q: number of pixels in the y-direction of object image, $(x_0, y_0)$: coordinates of a sampling point, $\psi_l$: rotation angle of Gabor wavelet around a sampling point $(x_0, y_0)$, l: rotation step, $u_0$: central frequency of Gabor wavelet of Eq. (22), and $\sigma_0^2$: variance of Gaussian window function.

8. A method for classifying an object in a moving picture, comprising:

preparing a template that includes Gabor wavelet expansion coefficients of an image of said object in a plurality of frames of a video image sequence representing each of a plurality of different reference motions of said object;

extracting an image of said object in a plurality of frames of a video image sequence representing an unknown motion of said object;

obtaining Gabor wavelet expansion coefficients of said extracted object image;

calculating matching factors between said unknown motion and said reference motions based on said Gabor wavelet expansion coefficients for said unknown motion and said Gabor wavelet expansion coefficients for said reference motions in said template; and classifying said unknown motion based on said matching factors, wherein said Gabor wavelet expansion coefficients for said reference motions and unknown motion are obtained at a plurality of selected sampling points in said object image with a coordinate origin being set to approximately a center of said object, and obtained at a plurality of predetermined rotation positions with each said sampling point being a center of rotation, and wherein said Gabor wavelet expansion coefficients are obtained at a plurality of scale transformation levels, and a number of said sampling points is set to a different number for each of said levels.

9. The method as set forth in claim 8, wherein said Gabor wavelet expansion coefficients are obtained at a plurality of scale transformation levels, and said calculating said matching factors is performed by assigning a predetermined weight to said Gabor wavelet expansion coefficients according to said levels.

10. A method for classifying a pattern of an object, comprising:

preparing a template including Gabor wavelet expansion coefficients of a reference pattern image representing a plurality of different reference patterns of said object;

obtaining Gabor wavelet expansion coefficients of an unknown pattern image representing an unknown pattern of said object;

calculating matching factors between said unknown pattern and said reference patterns based on said Gabor wavelet expansion coefficients for said unknown pattern and said Gabor wavelet expansion coefficients for said reference patterns in said template; and classifying said unknown pattern based on said matching factors, wherein said Gabor wavelet expansion coefficients for said reference patterns and unknown pattern are obtained based on Eq. (15) at a plurality of selected sampling points of said pattern image with a coordinate origin being set to approximately a center of said pattern image, and wherein said Gabor wavelet expansion coefficients are obtained at a plurality of scale transformation levels, and a number of said sampling points is set to a different number for each of said levels, $$(T_{m,l}s)(x_0, y_0) = \alpha^m \sum_{y=-q/2+1}^{q/2} \sum_{x=-p/2+1}^{p/2} s(x, y)\psi_l(\alpha^m x - x_0, \alpha^m y - y_0), \quad (15)$$

where $$\psi_l(X, y) = \psi(\dot{x}, \dot{y}), \quad (16)$$

$$\begin{bmatrix} \dot{x} \\ \dot{y} \end{bmatrix} = \begin{bmatrix} \cos\varphi_l & \sin\varphi_l \\ -\sin\varphi_l & \cos\varphi_l \end{bmatrix} \begin{bmatrix} x \\ y \end{bmatrix}, \quad (17)$$

and $$\psi(x, y) = \frac{1}{4\pi^2\sigma_0^2} e^{\frac{-1}{4\pi\sigma_0^2}(x^2+y^2)} \left[ e^{ju_0 x} - e^{-\pi\sigma_0^2 u_0^2} \right], \quad (18)$$

j: $(-1)^{1/2}$ (imaginary unit),

α: scale constant, m: scaling parameter for giving a scale transformation level, p: number of pixels in the x-direction of an object image, q: number of pixels in the y-direction of an object image, $(x_0, y_0)$: coordinates of a sampling point, $\phi_l$: rotation angle of Gabor wavelet around a sampling point $(x_0, y_0)$, l: rotation step $u_0$: central frequency of Gabor wavelet of Eq. (18), and $\sigma_0^2$: variance of Gaussian window function.

* * * * *